(12) United States Patent
Yamamoto et al.

(10) Patent No.: US 7,599,960 B2
(45) Date of Patent: Oct. 6, 2009

(54) METADATA PROCESSING METHOD, METADATA STORING METHOD, METADATA ADDING APPARATUS, CONTROL PROGRAM AND RECORDING MEDIUM, AND CONTENTS DISPLAYING APPARATUS AND CONTENTS IMAGING APPARATUS

(75) Inventors: Takashi Yamamoto, Kanagawa (JP); Tomoyuki Ohno, Kanagawa (JP); Tomoyasu Yoshikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 318 days.

(21) Appl. No.: 10/920,327

(22) Filed: Aug. 18, 2004

(65) Prior Publication Data
US 2005/0044112 A1     Feb. 24, 2005

(30) Foreign Application Priority Data
Aug. 19, 2003     (JP)     ............................. 2003-295586

(51) Int. Cl.
*G06F 7/00*     (2006.01)

(52) U.S. Cl. .................... 707/104.1; 707/200; 707/102; 348/231.2; 348/231.3; 348/231.5

(58) Field of Classification Search ................ 707/200, 707/101, 102, 104.1; 348/231.2, 231.3, 231.5
See application file for complete search history.

(56) References Cited

U.S. PATENT DOCUMENTS

| | | | |
|---|---|---|---|
| 6,408,301 B1 * | 6/2002 | Patton et al. ................ | 707/102 |
| 2002/0019833 A1 * | 2/2002 | Hanamoto ................... | 707/500 |
| 2002/0019982 A1 | 2/2002 | Aratani et al. ................ | 725/59 |
| 2002/0055943 A1 | 5/2002 | Kusama ....................... | 707/201 |
| 2002/0089610 A1 | 7/2002 | Ohno et al. .................. | 348/734 |
| 2003/0142236 A1 | 7/2003 | Aratani et al. ............... | 348/554 |
| 2003/0208778 A1 | 11/2003 | Aratani et al. ............... | 725/139 |
| 2003/0222889 A1 * | 12/2003 | Parulski et al. .............. | 345/619 |

(Continued)

FOREIGN PATENT DOCUMENTS

JP     11-242255     9/1999

OTHER PUBLICATIONS

Japanese Electronics Information Technical Industries Assoc., Image file format standards Exif Version 2.2 (JEITA CP-3451) (http//www.exif.org/Exif2-2.PDF) (Apr. 2002).

*Primary Examiner*—Don Wong
*Assistant Examiner*—Angela M Lie
(74) *Attorney, Agent, or Firm*—Fitzpatrick, Cella, Harper & Scinto

(57) ABSTRACT

The present invention enables to select necessary metadata from presumed metadata candidates that are more likely to be added and to easily select metadata desired by a user, thereby reducing working load on a user largely, and facilitating the operation of adding shooting scene information even to a large amount of shot data recorded in a large-capacity recording medium. A processing process of detecting metadata associated with second contents data from the second contents data which is in a same category as first contents data, and a processing process of selectably outputting candidates of non-time information metadata to be stored, associated with the first contents data, in a storing section, based on time information metadata and non-time information metadata associated with the second contents data and time information metadata associated with the first contents data which is to be added metadata, are performed.

6 Claims, 16 Drawing Sheets

U.S. PATENT DOCUMENTS

| | | | |
|---|---|---|---|
| 2004/0064455 A1* | 4/2004 | Rosenzweig et al. | 707/100 |
| 2004/0075752 A1* | 4/2004 | Valleriano et al. | 348/231.3 |
| 2004/0117830 A1 | 6/2004 | Ohno et al. | 725/51 |
| 2006/0206470 A1* | 9/2006 | McIntyre | 707/3 |

* cited by examiner

| CLASSIFICATION | TAG NAME | TAG NUMBER | TYPE | COUNT | VALUE | SUPPORT |
| --- | --- | --- | --- | --- | --- | --- |
| CAMERA INFORMATION | IMAGE INPUTTING DEVICE MAKER | 10Eh | ASCII | any | CHARACTER STRING INDICATING SHOOTING CAMERA MODEL | SEMIESSENTIAL |
| | IMAGE INPUTTING DEVICE MODEL | 10Fh | ASCII | any | CHARACTER STRING INDICATING SHOOTING CAMERA MAKER | SEMIESSENTIAL |
| IMAGE DATA INFORMATION | RESOLUTION OF IMAGE WIDTH | 11Ah | Rational | 1 | NUMBER OF PIXELS PER UNIT OF RESOLUTION OF IMAGE IN WIDTH DIRECTION | ESSENTIAL |
| | RESOLUTION OF IMAGE HEIGHT | 11Bh | Rational | 1 | NUMBER OF PIXELS PER UNIT OF RESOLUTION OF IMAGE IN HEIGHT DIRECTION | ESSENTIAL |
| | UNIT OF RESOLUTION | 128h | Short | 1 | 2: INCH , 3: CENTIMETER | ESSENTIAL |
| | IMAGE DIRECTION | 112h | Short | 1 | IMAGE DIRECTION IN VIEW OF ROW AND COLUMN | SEMIESSENTIAL |
| SHOOTING CONDITION INFORMATION | SHOOTING DATE AND TIME | 9003h | ASCII | 20 | SHOOTING DATE AND TIME (CHRISTIAN YEAR 24 HOURS) | SELECTION |
| | EXPOSURE TIME | 829Ah | Rational | 1 | EXPOSURE TIME (SECOND) | SEMIESSENTIAL |
| | FLASH OPERATION | 9209h | Short | 1 | PRESENCE OR ABSENCE OF ELECTRIC FLASH LIGHT-GENERATION OR RETURN DETECTION | SEMIESSENTIAL |
| | EXPOSURE MODE | A402h | Short | 1 | 0:AUTO EXPOSURE 1:MANUAL EXPOSURE | SEMIESSENTIAL |
| | WHITE BALANCE | A403h | Short | 1 | 0:AUTO WHITE BALANCE 1:MANUAL WHITE BALANCE | SEMIESSENTIAL |
| | SHOOTING SITUATION | A406h | Short | 1 | 0:STANDARD, 1:LANDSCAPE, 2:PORTRAIT, 3:NIGHT SCENE MODE | SEMIESSENTIAL |
| SHOOTING SCENE | SHOOTING THEME | D001h | Long | 1 | THEME OF SHOOTING SCENE | SELECTION |
| | SHOOTING SCENE | D002h | Long | 1 | SHOOTING SCENE | SELECTION |

Fig. 4

| "SHOOTING THEME" METADATA | | "SHOOTING SCENE" METADATA | | | |
|---|---|---|---|---|---|
| VALUE | THEME | VALUE | THEME | STEP | REQUIRED TIME (MINUTE) |
| xxx1h | BRIDAL PARTY | yyy1h | GUEST RECEPTION | 1 | 10 |
| | | yyy2h | GUEST ENTRY | 2 | 10 |
| | | yyy3h | BRIDAL COUPLE ENTRY | 3 | 5 |
| | | | SEATING ON STAGE | 4 | 1 |
| | | ..... | OPENING SPEECH | 5 | 1 |
| | | | MAIN GUEST SPEECH | 6 | 20 |
| | | | CUTTING INTO WEDDING CAKE | 7 | 5 |
| | | | TOAST | 8 | 3 |
| | | | DINING | 9 | 20 |
| | | | BRIDE EXIT FOR MAKEOVER | 10 | 5 |
| | | | BRIDEGROOM EXIT | 11 | 10 |
| | | | BRIDAL COUPLE RE-ENTRY (MAKEOVER) | 12 | 15 |
| | | | CANDLE SERVICE | 13 | 5 |
| | | | SPEECH AND ENTERTAINMENT | 14 | 20 |
| | | | READING OF CONGRATULATORY MESSAGE | 15 | 5 |
| | | | FLOWER BOUQUET PRESENTATION | 16 | 3 |
| | | | BRIDEGROOM THANKS SPEECH | 17 | 2 |
| | | | BRIDAL COUPLE EXIT | 18 | 2 |
| | | | CLOSING SPEECH | 19 | 1 |
| | | | GUEST EXIT | 20 | 10 |
| | | | SEND-OFF | 21 | 10 |
| | | | SNAP | -1 | N.A. |
| xxx2h | GRADUATION CEREMONY | ..... | ATTENDING SCHOOL | 1 | 15 |
| | | ..... | SCHOOL GATE | 2 | 15 |
| | | | GRADUATES ENTRY | 3 | 5 |
| | | | OPENING SPEECH | 4 | 1 |
| | | | SINGING OF NATIONAL ANTHEM | 5 | 3 |
| | | | PRESENTATION OF SCHOOL DIPLOMAS | 6 | 20 |
| | | | SPEECH OF SCHOOL PRINCIPAL | 7 | 5 |
| | | | ..... | ... | ... |
| | | | CLOSING SPEECH | 12 | |
| | | ..... | SNAP | -1 | N.A. |
| xxx3h | ENTRANCE CEREMONY | ..... | | | |
| | | ..... | ..... | | |
| | | ..... | ..... | | |
| | ..... | | | | |

*Fig.5*

| SCENE | DISPLAY SIZE | DISPLAY EFFECT | SWITCHING EFFECT | BGM |
|---|---|---|---|---|
| GUEST RECEPTION | MIDDLE | SOFT FOCUS | FADE-IN | |
| GUEST ENTRY | SMALL | | | |
| BRIDAL COUPLE ENTRY | LARGE | | FADE-IN | MAFUYU NO YONOYUME |
| SEATING ON STAGE | LARGE | | | |
| OPENING SPEECH | SMALL | | | NOTHING |
| MAIN GUEST SPEECH | MIDDLE | | | NOTHING |
| CUTTING INTO WEDDING CAKE | LARGE | SOFT FOCUS | | NONKIDE ONLY YOU |
| TOAST | MIDDLE | | | KANPAI NO KYOKU |
| DINING | SMALL | | | |
| BRIDE EXIT FOR MAKEOVER | SMALL | | FADE-OUT | |
| BRIDEGROOM EXIT | SMALL | | | |
| BRIDAL COUPLE RE-ENTRY (MAKEOVER) | LARGE | | | BIJO KA YAJUU |
| CANDLE SERVICE | LARGE | | CROSS-FILTER | |
| SPEECH AND ENTERTAINMENT | MIDDLE | | | |
| READING OF CONGRATULATORY MESSAGE | SMALL | | | |
| FLOWER BOUQUET PRESENTATION | LARGE | | | HOSI NI NOZOMIWO |
| BRIDEGROOM THANKS SPEECH | MIDDLE | | | |
| BRIDAL COUPLE EXIT | MIDDLE | | | |
| CLOSING SPEECH | SMALL | | | |
| GUEST EXIT | SMALL | | | |
| SEND-OFF | MIDDLE | | | |
| SNAP | SMALL | | REDUCED TIME | |

Fig. 11

| SCENE | ASSIST |
|---|---|
| GUEST RECEPTION | ELECTRIC FLASH = NO FLASH, EXPOSURE ADJUSTMENT = +0.5 METERING SYSTEM = MULTI-SPOT METERING, COMPRESSION RATE = HIGHEST |
| GUEST ENTRY | — |
| BRIDAL COUPLE ENTRY | ELECTRIC FLASH = NO FLASH, EXPOSURE ADJUSTMENT = +1 METERING SYSTEM = SPOT METERING, COMPRESSION RATE = HIGH |
| SEATING ON STAGE | — |
| OPENING SPEECH | — |
| MAIN GUEST SPEECH | — |
| CUTTING INTO WEDDING CAKE | ELECTRIC FLASH = NO FLASH, EXPOSURE ADJUSTMENT = −1 METERING SYSTEM = SPOT METERING |
| TOAST | — |
| DINING | ELECTRIC FLASH = RED-EYE-REDUCTION AUTO |
| BRIDE EXIT FOR MAKEOVER | — |
| BRIDEGROOM EXIT | — |
| BRIDAL COUPLE RE-ENTRY (MAKEOVER) | — |
| CANDLE SERVICE | ELECTRIC FLASH = NO FLASH, EXPOSURE ADJUSTMENT = +1 METERING SYSTEM = MULTI-SPOT METERING |
| SPEECH AND ENTERTAINMENT | — |
| READING OF CONGRATULATORY MESSAGE | — |
| FLOWER BOUQUET PRESENTATION | — |
| BRIDEGROOM THANKS SPEECH | — |
| BRIDAL COUPLE EXIT | — |
| CLOSING SPEECH | — |
| GUEST EXIT | — |
| SEND-OFF | — |
| COMMUNE | — |
| SNAP | ELECTRIC FLASH = RED-EYE-REDUCTION AUTO, METERING SYSTEM = MULTI-SPOT METERING, COMPRESSION RATE = NORMAL |

*Fig.16*

METADATA PROCESSING METHOD, METADATA STORING METHOD, METADATA ADDING APPARATUS, CONTROL PROGRAM AND RECORDING MEDIUM, AND CONTENTS DISPLAYING APPARATUS AND CONTENTS IMAGING APPARATUS

BACKGROUND OF THE INVENTION

1. Field of the Invention

The present invention relates to a metadata processing method, a metadata storing method, a metadata adding apparatus, a control program and a recording medium, and a contents displaying apparatus and a contents imaging apparatus. The present invention relates particularly to an apparatus for adding metadata and a method therefor.

2. Description of the Related Art

Japanese Patent Application Laid-Open (JP-A) No. 11-242255 describes an information inputting apparatus of a camera which is capable of set exposure conditions of given snapshots desired by a photographer (user) and the shooting order thereof by simple operation.

In addition, image data electronically shot by a digital camera is recorded in recording media such as a memory card electronically as an image file. Then, an image file to be recorded includes additional information regarding shooting as well as the image data.

More specifically, in the image file format standards Exif2.2 (JEITA CP-3451) for a digital camera established by Japan Electronics and Information Technology industries Association (JEITA), it is defined that information of a camera used in snap-shooting, information of recorded image data, information of shooting conditions or the like are stored as additional information of image.

Information of a camera in accordance with these standards includes a name of a maker and a model of an image inputting device (camera). Also, information of image data includes a resolution of vertical and horizontal directions and an image direction, and information of shooting conditions includes shooting date and time, an exposure time, an operating state of an electric flash, an exposure mode, a white balance and a shooting situation.

This shooting situation is information for classifying "standard", "portrait" (vertical placement), "landscape" (horizontal placement) or "night scene". This additional information is information which is attached independently to each piece of shot data. A part of such additional information is useful information of a shooting scene. It is extremely useful to add to shot data, information of, for example, a scene of entry of a bridal couple, a scene of greeting of a main guest or a scene of cutting into a wedding cake in an event of a bridal party in order for a user to view the shot data later.

In a situation where the number of snapshots to be recorded is increased more and more as the recording capacity of a recording medium used in a digital camera increases, in viewing or arranging shot data, information indicative of a situation of the shot data plays an important role.

However, the above-described conventional additional information included in a digital camera has problems as follows:

The conventional additional information is information to be added to each piece of shot data independently as metadata. The operation of adding appropriate one from plural pieces of metadata has to be carried out manually by a user for each piece of shot data. Therefore, addition of information to a large amount of data is extremely difficult in fact.

Specifically, a 512 MB compact flash memory card which is used as recording media of a digital camera can store 300 or more high-quality shot image files of 2024×1536 pixels (about 3,100,000 pixels).

In addition, in the case of a commonly-used middle-size image file of 1024×768 pixels (about 780,000 pixels), more than 1,600 shot image files can be stored.

In this way, as the number of image files is significantly increased with increasing capacity of a recording media, it becomes very difficult, impossible in fact, for a user to provide additional information to each piece of the image data.

SUMMARY OF THE INVENTION

Accordingly, it is an object of the present invention to provide a metadata processing method, a metadata storing method, a metadata adding apparatus, a control program for controlling the apparatus and a recording medium with the control program recorded therein, which enables a user to select necessary metadata from estimated metadata candidates which are more likely to be added and to readily select desired metadata, thereby largely reducing working load on the user and facilitating the operation of adding shooting scene information even to a large amount of shot data recorded in a large-capacity recording medium.

Further, another object of the present invention is to provide a contents displaying apparatus and a contents imaging apparatus which enable a user to readily select necessary, desired metadata from estimated metadata candidates that are more likely to be added, thereby largely reducing working load on the user and facilitating the operation of adding metadata to contents data.

In order to achieve the above-mentioned objects, a first aspect of the present invention is a metadata processing method comprising the steps of: detecting metadata associated with data of second contents from the data of the second contents which are in a same category as data of first contents; and selectably outputting candidates of at least one piece of non-time information metadata to be stored associated with the data of the first contents in storing means, based on time information metadata and non-time information metadata associated with the data of the second contents and time information metadata associated with the data of the first contents which are to be added metadata next.

A second aspect of the present invention is a metadata storing method comprising the steps of: detecting metadata associated with data of second contents from the data of the second contents which are in a same category as data of first contents; and storing at least one piece of non-time information metadata in storing means as associated with the data of the first contents, based on time information metadata and non-time information metadata associated with the data of the second contents and time information metadata associated with the data of the first contents which are to be added metadata next, and in which at least one metadata candidate associated with the data of the first contents is selected, and at least one piece of metadata selected from the at least one metadata candidate is stored in the storing means as associated with the data of the first contents.

In the first and second aspects of the present invention, preferably, after data of plural contents is recorded, the non-time information metadata is stored in the storing means as associated with each of the data of the plural contents recorded.

In the first and second aspects of the present invention, preferably, after the data of the second contents is stored in the storing means and before the data of the first contents is stored in the storing means, the non-time information metadata is associated with the data of the first contents.

A third aspect of the present invention is a metadata adding apparatus comprising: metadata adding means for selecting metadata candidates including at least one piece of metadata associated with first contents and storing, as associated with the first contents, at least one piece of metadata selected from the metadata candidates, wherein the metadata adding means includes: a detecting portion for detecting metadata associated with second contents from data of the second contents which are in a same category as data of the first contents; and a storing portion for, based on time information metadata and non-time information metadata associated with the data of the second contents and time information metadata associated with the data of the contents which are to be added metadata, storing at least one piece of non-time information metadata as associated with the data of the contents.

A fourth aspect of the present invention is a control program comprising the steps of: detecting metadata associated with data of second contents from the data of the second contents which are in a same category as data of first contents; and storing at least one piece of non-time information metadata as associated with the data of the first contents, based on time information metadata and non-time information metadata associated with the data of the second contents and time information metadata associated with the data of the first contents which are to be added metadata, and wherein the control program makes a computer execute processing of selecting at least one metadata candidate associated with the contents and storing at least one piece of metadata selected from the at least one metadata candidate, as associated with the contents.

A fifth aspect of the present invention is a recording medium comprising: a metadata adding step of selecting at least one metadata candidate associated with contents and storing, as associated with the contents, at least one piece of metadata selected from the at least one metadata candidate, the metadata adding step including: a step of detecting metadata associated with second contents from data of the second contents which are in a same category as data of the first contents; and a step of storing at least one piece of non-time information metadata as associated with the data of the first contents, based on time information metadata and non-time information metadata associated with the data of the second contents and time information metadata associated with the data of the first contents which are to be added metadata, wherein a control program for making a computer execute the metadata adding step is stored in the contents.

A sixth aspect of the present invention is a contents displaying apparatus comprising: displaying means configured to be able to display contents; and metadata adding means for selecting at least one metadata candidate associated with the contents and storing, as associated with the contents, at least one piece of metadata selected from the at least one metadata candidate, wherein the metadata adding means includes: a detecting portion for detecting metadata associated with data of second contents from the data of the second contents which are in a same category as data of first contents; and a storing portion for storing at least one piece of non-time information metadata as associated with the data of the first contents, based on time information metadata and non-time information metadata of the metadata associated with the data of the second contents and time information metadata associated with the data of the first contents which are to be added non-time information metadata, and the contents with which the metadata is associated is displayed on the displaying means.

In the sixth aspect of the present invention, typically, a display layout of the contents is changeable based on the non-time information metadata associated with the contents.

In the sixth aspect of the present invention, typically, a display effect of the contents is changeable based on the non-time information metadata associated with the contents.

In the sixth aspect of the present invention, typically, a switching effect in switching a display of the contents to a display of other contents is changeable based on the non-time information metadata associated with the contents.

In the sixth aspect of the present invention, typically, audio information and/or speech information replayed in displaying the contents is changeable based on the non-time information metadata stored associated with the contents.

A seventh aspect of the present invention is a contents imaging apparatus comprising:

imaging means for generating data of contents by imaging an object; and metadata adding means for selecting at least one metadata candidate associated with the contents and storing, as associated with the contents, at least one piece of metadata selected from the at least one metadata candidate, wherein the metadata adding means includes: a detecting portion for detecting metadata associated with data of second contents from the data of the second contents which are in a same category as data of first contents; and a storing portion for storing at least one piece of non-time information metadata as associated with the data of the first contents, based on time information metadata and non-time information metadata associated with the data of the second contents and time information metadata associated with the data of the first contents which are to be added metadata.

In the seventh aspect of the present invention, preferably, an imaging condition of the first contents is changeable based on the non-time information metadata stored associated with the first contents.

In the seventh aspect of the present invention, preferably, candidates of a shooting condition of the first contents are selected based on the non-time information metadata stored associated with the first contents and an output is produced so that a user can select from the candidates.

According to the present invention, since a user can select necessary metadata from estimated metadata candidates that are more likely to be added, appropriate metadata is allowed to be added to desired contents simply and easily, and working load on the user can be reduced largely. Therefore, even if a large amount of contents data such as shot data is recorded in a large-capacity recording medium, it is possible to facilitate the operation of adding metadata of shooting scene information and the like to the data.

Further, since the shooting contents become clear from the shooting scene information, it is possible for a user to select an appropriate display effect to view contents in a displaying apparatus and to enjoy a more-expressive, sharp or dynamic slide show in an automatic way.

Furthermore, since a shooting situation becomes almost clear, it is possible to in snap-shooting, easily select and utilize setting of high-level, appropriate shooting conditions in a contents imaging apparatus, thereby enabling finer snap-shooting.

BRIEF DESCRIPTION OF THE DRAWINGS

The invention, together with further advantages thereof, may be best understood by reference to the following description taken in conjunction with the accompanying drawings in which:

FIG. 4 is a table showing a list of metadata according to the first embodiment of the present invention;

FIG. 5 is a table showing a structure of a shooting scene metadata set table according to the first embodiment of the present invention;

FIG. 11 is a table showing a structure of album layout data set according to the first embodiment of the present invention;

FIG. 16 is a table showing a structure of an operation condition assist table according to the second embodiment of the present invention.

DESCRIPTION OF THE PREFERRED EMBODIMENTS

Following description is made about embodiments of the present invention with reference to the drawings. In all the drawings of embodiments explained below, same numerals are attributed to the same or corresponding parts.

First Embodiment

Figure 1:
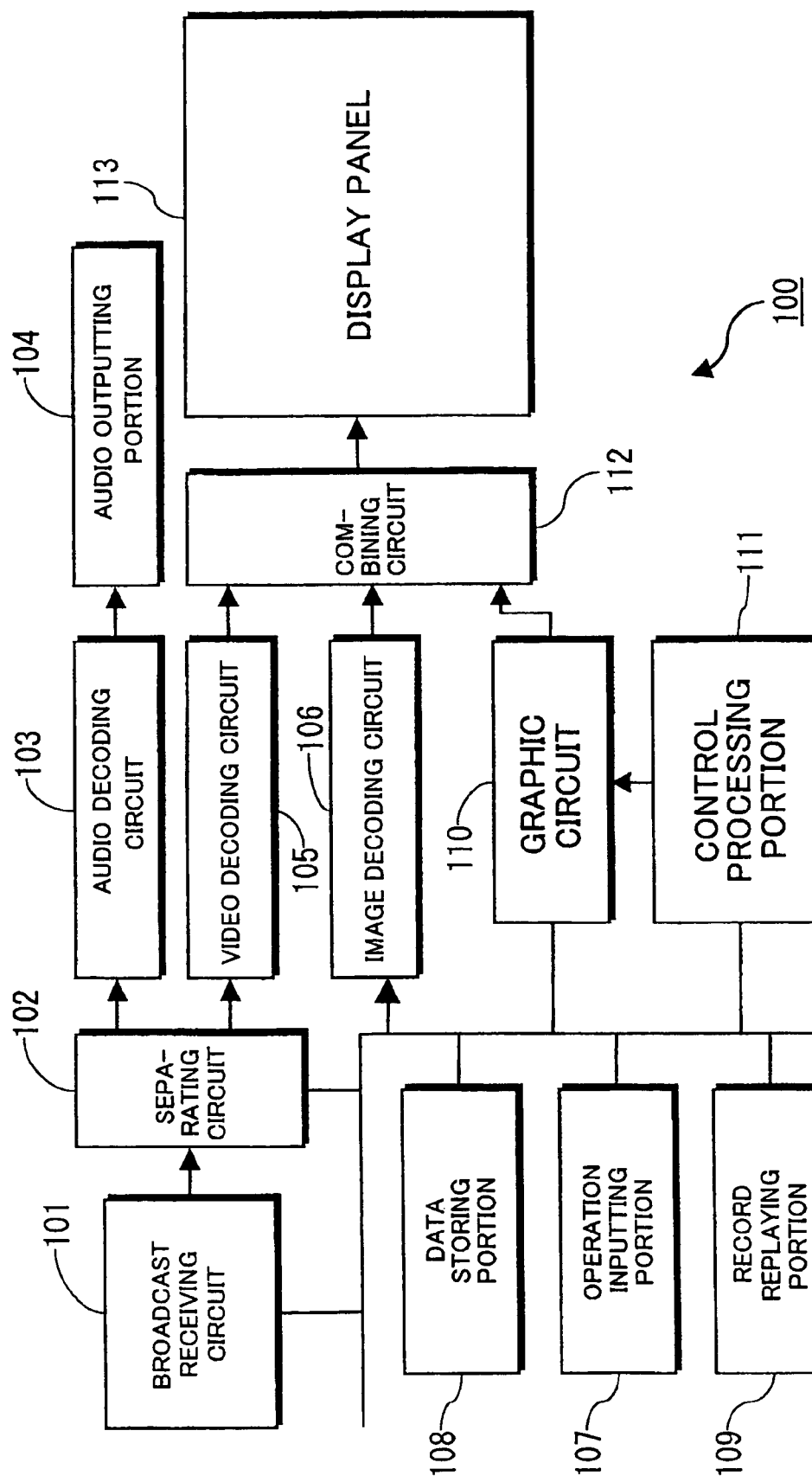
FIG. 1 is a block diagram illustrating a configuration of a digital television according to a first embodiment of the present invention.

First description is made about a digital television including a metadata adding apparatus according to the first embodiment of the present invention. FIG. 1 shows a digital television to which the first embodiment is applicable. Here in this embodiment, the digital television is a television having a function of visualizing shot image and making it audiovisual.

As shown in FIG. 1, the digital television 100 according to the first embodiment includes a broadcast receiving circuit 101, a separating circuit 102, a audio decoding circuit 103, a audio outputting portion 104, a video decoding circuit 105, an image decoding circuit 106, an operation inputting portion 107, a data storing portion 108, a record replaying portion 109, a graphic circuit 110, a control processing portion 111, a combining circuit 112 and a display panel 113.

The broadcast receiving circuit 101 is configured to receive a broadcast signal from a reception antenna (not shown) of digital broadcasting and a broadcast signal of CATV. The broadcast receiving circuit 101 selects a predetermined transmission channel from a received signal based on control of the control processing portion 111 described below, demodulates received data of the transmission channel and outputs it as a TS signal.

The separating circuit 102 extracts program information from the TS signal and supplies the program information to the control processing portion 111 described later. The separating circuit 102 also separates the TS signal into a desired video signal, a audio signal and a data broadcast signal in accordance with control by the control processing portion 111.

The data broadcast signal separated by this separating circuit 102 is first stored in the data storing portion 108 to be read out by the control processing portion 111 in viewing data broadcast.

Further, the audio decoding circuit 103 is a circuit for decoding a audio signal. The audio signal is decoded by this audio decoding circuit 103 and supplied to the audio outputting portion 104. Then, the decoded audio signal is D/A converted and outputted as speech by the audio outputting portion 104.

The video decoding circuit 105 is a circuit for decoding a video signal. The video signal is decoded by this video decoding circuit 105 and supplied via the combining circuit 112 to the display panel 113 to be displayed. Here, a device consisting in the display panel 113 includes a flat panel of a matrix electrode structure including a liquid crystal display and a plasma display and a CRT by a Braun tube.

Further, the operation inputting portion 107 is configured of a receiving portion of a remote controller which utilizes an infrared signal or the like and an operation switch provided directly on the digital television 100. This operation inputting portion 107 is configured to supply operation input information to the control processing portion 111 based on user's operation and input.

Furthermore, based on the user's operation input supplied from the operation inputting portion 107, the program information inputted from the separating circuit 102 or the data broadcast signal read out from the data storing portion 108, the control processing portion 111 controls the graphic circuit 110 to generate a graphic signal which is to be presented to the user.

The generated graphic signal is supplied to the combining circuit 112. The combining circuit 112 combines a vide signal by the video decoding circuit 105 and a still image signal by the image decoding circuit 106, which is described later appropriately to be displayed on the display panel 113.

In the thus-configured digital television 100, due to the full control by the control processing portion 111, digital broadcasting is received based on a user's operation so that the user can view desired broadcast program.

In the above-described digital television 100, the record replaying portion 109 is a portion for carrying out data input/output of a recording medium such as a memory card. In other words, a detachable memory card, which can store image data taken by a digital camera (not shown), is set at the record replaying portion 109 and subjected to predetermined control thereby to carry out input/output of shot image data and image file data including additional information. Then, read data is stored in the data storing portion 108 as an image file.

The control processing portion 111 controls, based on an already stored program, a display as a graphical interface to be displayed on the display panel 113 through the graphic circuit 110.

Further, following a user operation inputted by the operation inputting portion 107, the control processing portion 111 reads out an image file stored in the data storing portion 108 so that image data is supplied to the image decoding circuit 106.

The image decoding circuit 106 decodes image data, which is combined with graphic for operation at the combining circuit 12 to be displayed on the display panel 113.

With this configuration, in the digital television 100, since the control processing portion 111 fully controls the above-described components, image shot by a digital camera is made visual based on a user operation.

Figure 2:
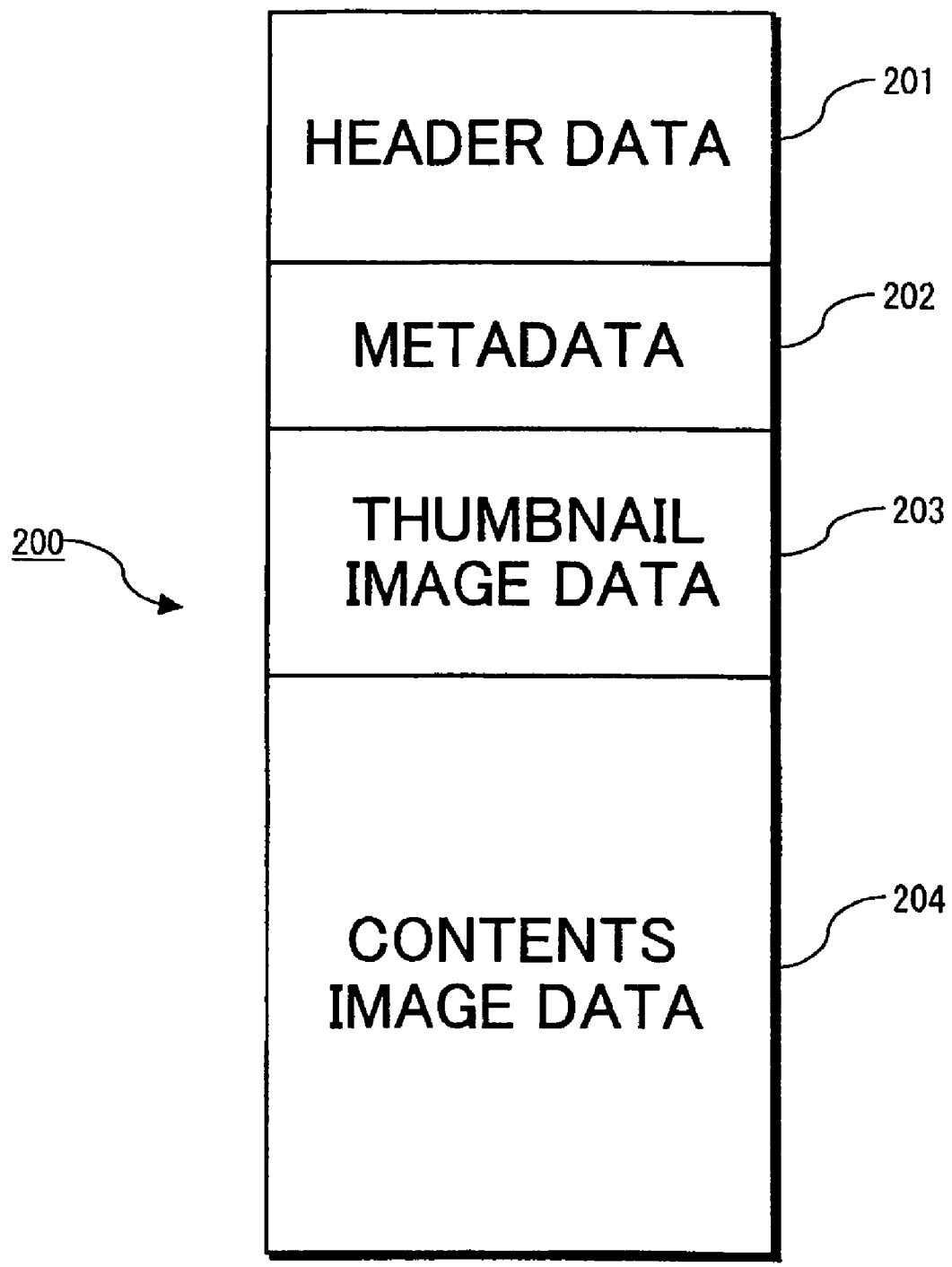
FIG. 2 is a diagram illustrating a structure of an image file according to the first embodiment of the present invention.

A file structure of an image file inputted to the thus configured digital television 100 is shown in FIG. 2. This image file is, in the digital television 100, inputted via the record replaying portion 109 of a recording medium and stored in the data storing portion 108.

As shown in FIG. 2, the image file 200 has header data 201 indicative of image file information itself, metadata 202 as additional information and thumbnail image data 203 as reduced image for caption of contents image data, and these are all stored in addition to the contents image data 204 which is taken by a digital camera and compressed. A basic structure of the metadata 202 included in the image file is shown in FIG. 3.

Figure 3:
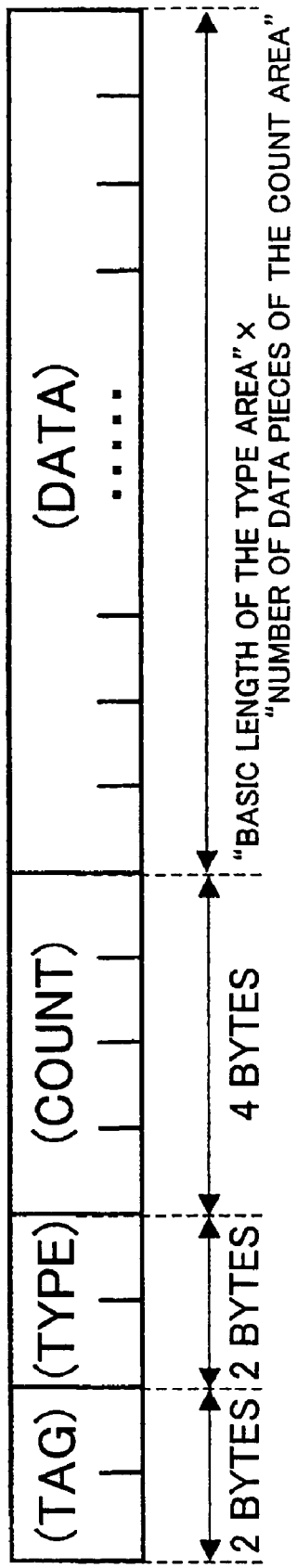
FIG. 3 is a diagram illustrating a basic structure of metadata according to the first embodiment of the present invention.

As shown in FIG. 3, the metadata 202 is configured of a 2-byte tag number area indicative of kinds of the metadata 202, a 2-byte type area indicative of a basic length of the data, a 4-byte count area indicative of the number of data pieces and a data area indicative of contents of the metadata 202. The byte number of the data area is calculated by "basic length of the type area"ב"number of data pieces of the count area".

Then, a list of the metadata 202 is seen in the table of FIG. 4, which shows kinds and contents of the metadata 202. In the table of the metadata 202 on FIG. 4, it is defined as types indicating data basic lengths that "ASCII" is 1 byte including an ASCII code of 7 bits, "Short" is 2 bytes including a 16-bit unsigned integer, "Long" is 4 bytes including a 32-bit unsigned integer and "Rational" is 8 bytes including two 32-bit unsigned integers. "any" in the item of "Count" shows an arbitral natural number.

In the item of "Support", "essential" means that metadata 202 is essential for each file, and "semiessential" means that metadata 202 is essential as long as there are no constraints of a hardware in a device for outputting an image file of shot image data, or, for example, a digital camera in the first embodiment. And, "selection" means that metadata can be added if necessary.

Also in FIG. 4, "shooting scene" metadata is additional information indicative of a situation in snap-shooting, that is, a shooting scene. The "shooting scene" indicates a scope of situation specified by "shooting theme" metadata as a category, in other words, a particular situation which may happen for each shooting theme. A part of a list of shooting scenes defined per shooting theme is shown in FIG. 5.

In other words, as shown in FIG. 5, according to this first embodiment, "bridal party" is cited as a shooting theme. Specifically, for example, "bridal party" of the shooting theme includes a "guest reception" scene in which a bridal couple receives guests, a "guest entry" scene in which guests enter a bridal party room, a "bridal couple entry" scene which comes before starting of the bridal party, a "send-off" scene in which the bridal couple sends off the guests after the bridal party has finished, a "snap" scene for shooting snaps of the guests, the bridal party room and the surrounding area, and so on.

In the case where "graduation ceremony" is cited as the shooting theme, its theme includes scenes that may happen in snap-shooting the graduation ceremony.

The above-mentioned shooting scenes happen in the order basically determined for each shooting theme. For example, when the shooting theme is a "bridal party", the occurrence order of scenes is determined by the ceremony order of the bridal party and shooting situations occur in this occurrence order.

Numbers in the "step" shown in FIG. 5 is integer numbers indicative of this occurrence order and arranged in the ascending order based on the occurrence order. Since a required time for each shooting scene is almost predictable, it is defined within the bounds of socially common sense for each shooting scene.

Also in FIG. 5, among values of "shooting scene" metadata in the shooting theme "bridal party", the step of "snap" is given a value "−1". This value means that the occurrence order cannot be specified in the shooting theme. In other words, since snapshot chances can happen with any timing during the bridal party and a required time for each snapshot cannot be defined, the step of "snap" is given a value of "−1" that means that the occurrence order cannot be specified.

Further, the shooting scene metadata set table which defines the "shooting theme" metadata, the step for each of "shooting theme" metadata and required times, all shown in FIG. 5, is previously stored in the data storing portion 108 of the digital television 100.

Figure 6:
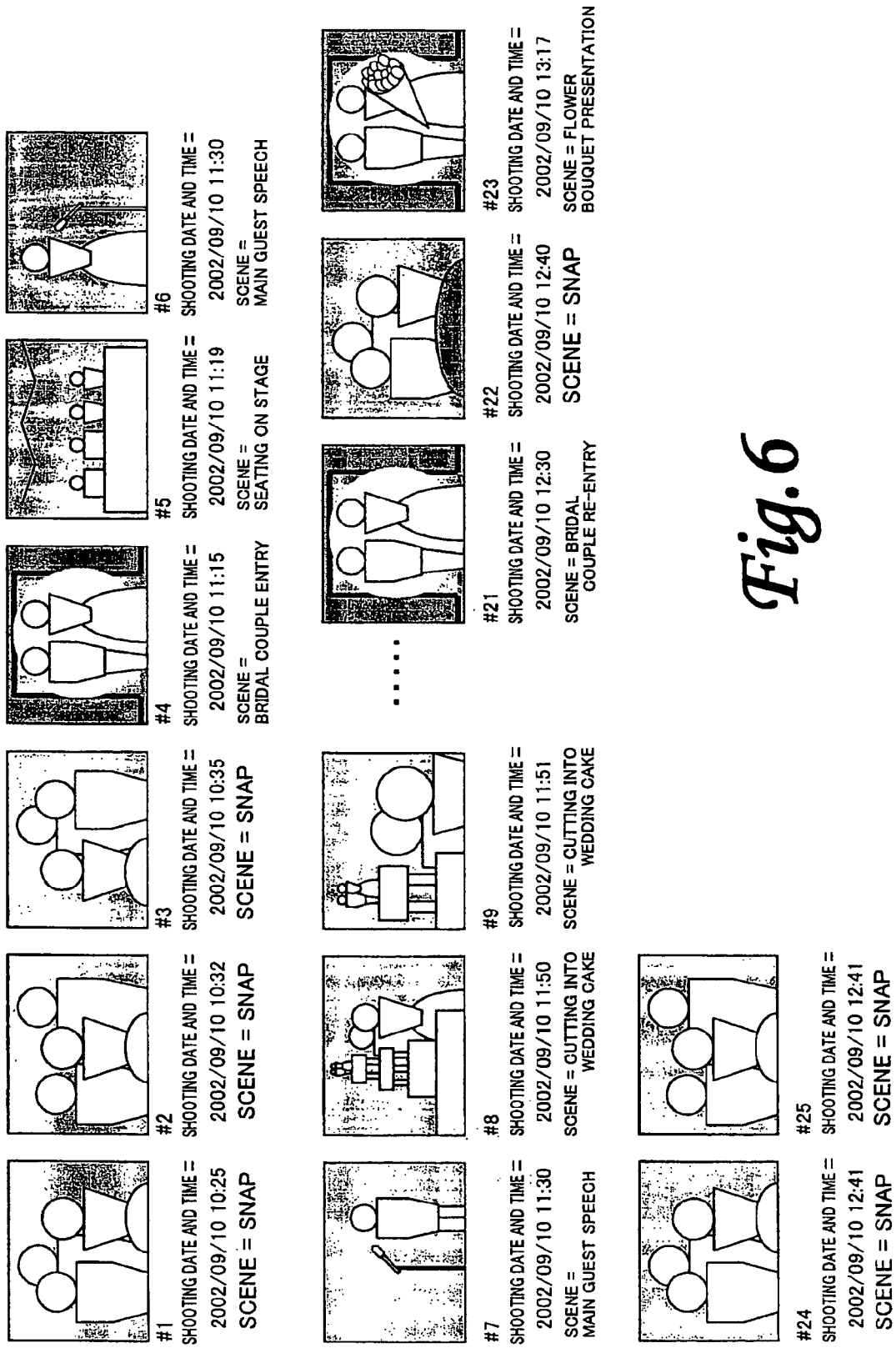
FIG. 6 is a view showing the whole shot image files according to the first embodiment of the present invention.

Furthermore, FIG. 6 conceptually shows an example of plural image files as a whole which are input to the digital television 100 via the record replaying portion 109 and stored in the data storing portion 108.

For example, first, a user attends to a bridal party of his/her friend as a guest and shoots 25 snaps by use of a digital camera. Then, the user makes data of the 25 image files recorded in a recording medium such as a memory card and then, sets the recording medium, in which the 25 image files are recorded, in the digital television 100 according to the first embodiment. With this configuration, these 25 image data files are stored in the data storing portion 108.

In FIG. 6, the "shooting date and time" metadata and "shooting scene" metadata are only shown, and display of other metadata is omitted. However, the metadata are not always limited to these two kinds of metadata.

Figure 7:
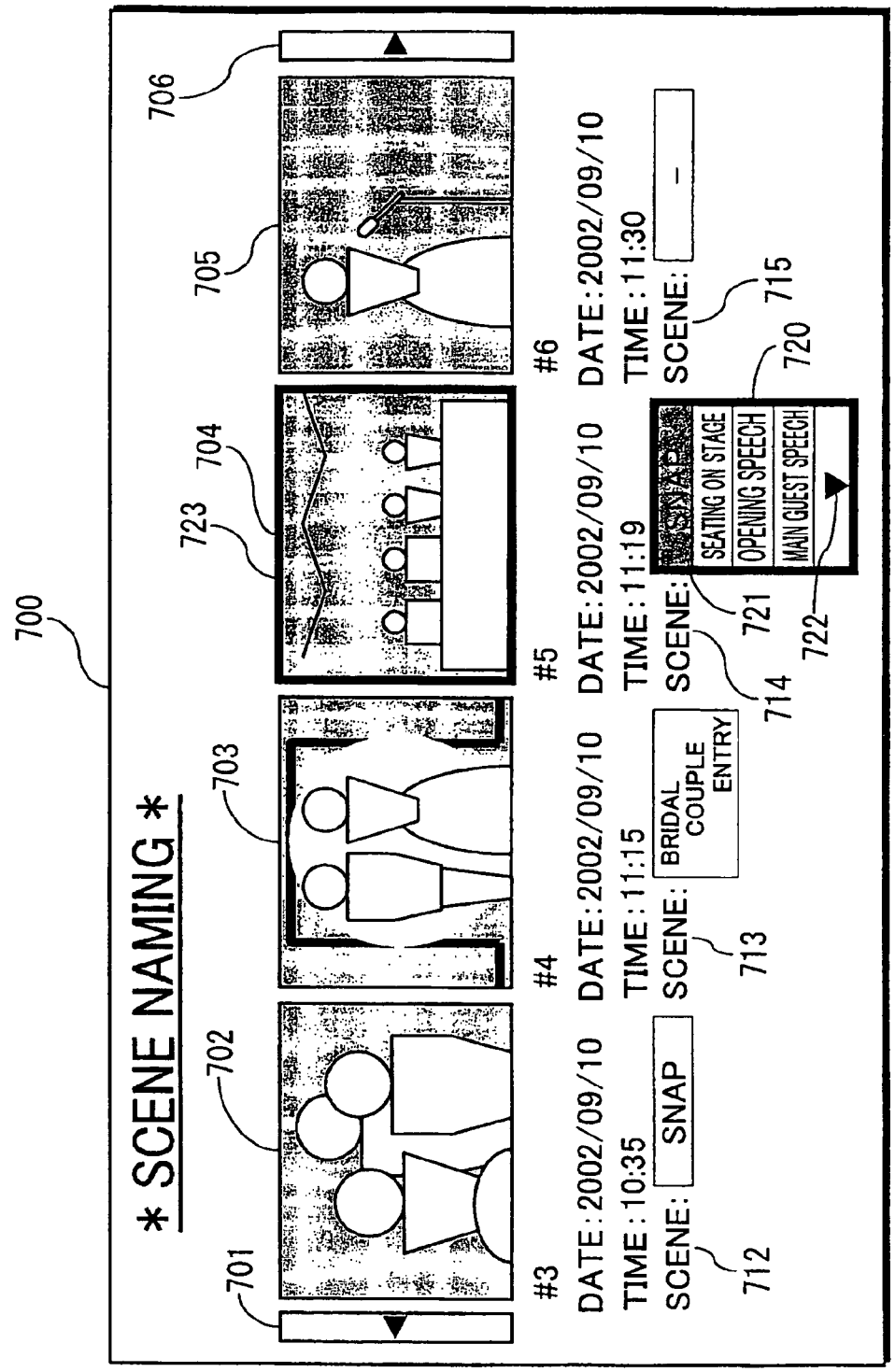
FIG. 7 is a view illustrating a screen display for performing the operation of adding metadata according to the first embodiment of the present invention.
Figure 8:
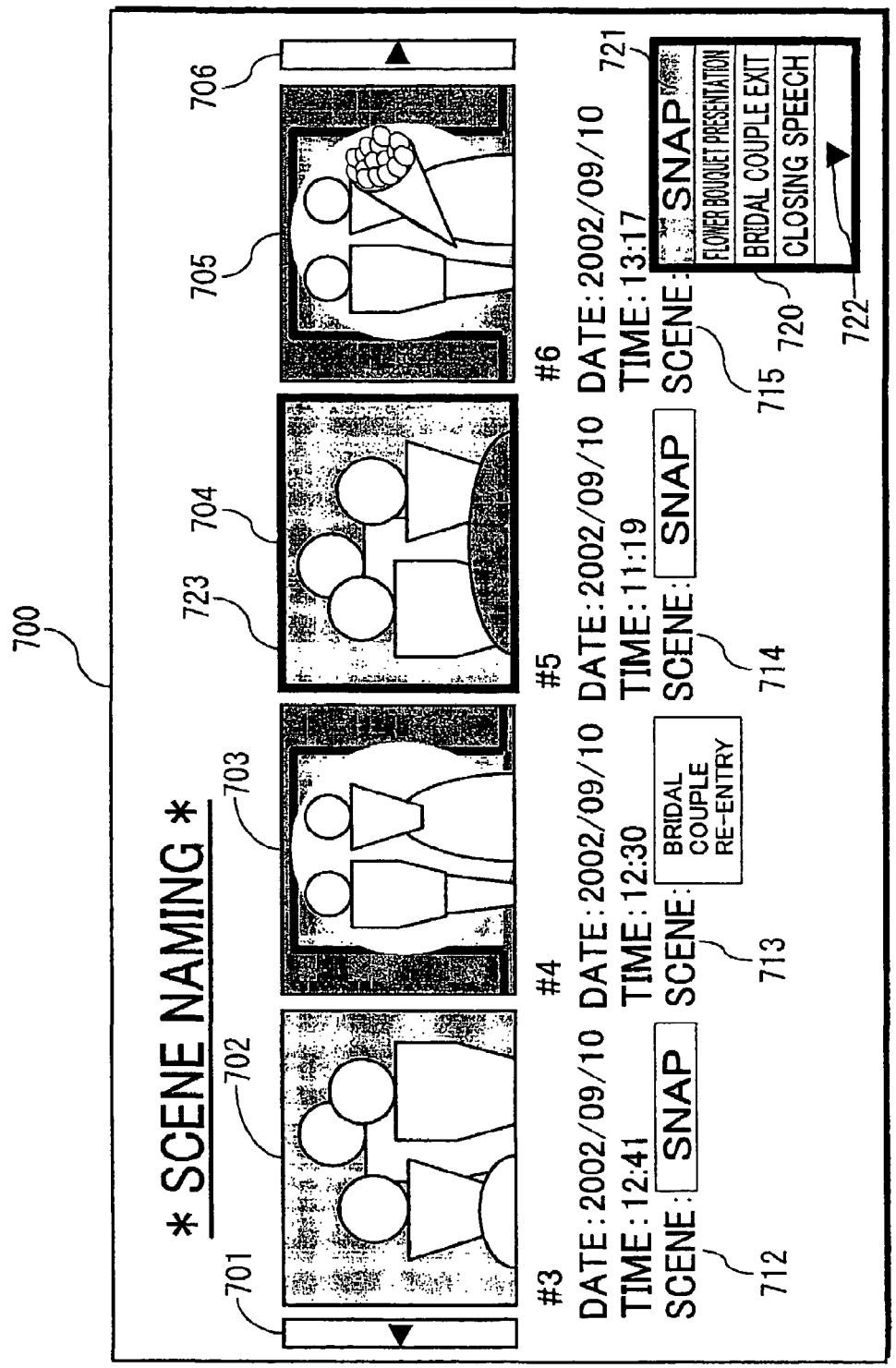
FIG. 8 is a schematic view illustrating a screen display when the operation of adding metadata is carried out according to the first embodiment of the present invention.

The "shooting data and time" metadata as one example of time information metadata is added to image data as contents data in shooting. The "shooting scene" metadata as one example of other non-time information metadata is added to the image data based on a predetermined adding method. This adding method is specifically described below. FIGS. 7 and 8 show a screen displayed when the processing of adding "shooting scene" metadata to shot image data files in the digital television 100 according to the first embodiment is carried out.

As shown in FIGS. 7 and 8, thumbnail images 702, 703, 704 and 705 of image data files corresponding to the third to sixth shots of all image data files are displayed on a screen 700.

Out of metadata stored associated with these image data files, data and time based on the "shooting data and time" metadata are displayed on the screen 700 as additional information 712, 713, 714 and 715 of the image data.

In FIG. 7, addition of "shooting scene" metadata starts in the left-to-right order. Then, what is shown in FIG. 7 is a state when "shooting scene" metadata is added to image data "#5" (see FIG. 6). Here, a value "snap" is already added to the image data "#3", and a value "bridal couple entry" is already added to the image data "#4", which are displayed on the screen 700.

Seen from a focus display 723 indicative of remarkable image data, the image data "#5" is an object to which metadata is to be added. When a user wants to add a shooting scene of image data "#5" and pushes a decision button of a remote controller, a list of metadata candidates 720 is displayed on a section of scene of the information display 714 as metadata candidates which are to be associated with the scene.

In the list of metadata candidates 720 of the scene, scenes that are more likely to be selected are listed in the time order. Then, when a user controls an up/down button of the remote controller (not shown) while the list of metadata candidates 720 is displayed, a remarkable point 721 can be moved up and down in the list.

Then, when the user pushes a decision button of the remote controller, one piece of the "shooting scene" metadata corresponding to the remarkable point 721 is selected so that this selected metadata piece can be added to the image data. Further, when the user controls the right-and-left button of the remote controller, the focus display 723 is moved from right thumbnail image to left thumbnail image, and vice versa.

In addition, when the focus display 723 exceeds the image "#3" of the left side and reaches an icon 701, the whole screen is scrolled to display data preceding the image data "#3". On the other hand, likewise, when the focus display 723 exceeds an image "#6" of the right side and reaches an icon 706, image data following the image data "#6" is displayed.

With such a configuration, the screen display for adding "shooting scene" metadata to an image data file according to the first embodiment is made.

Figure 9:
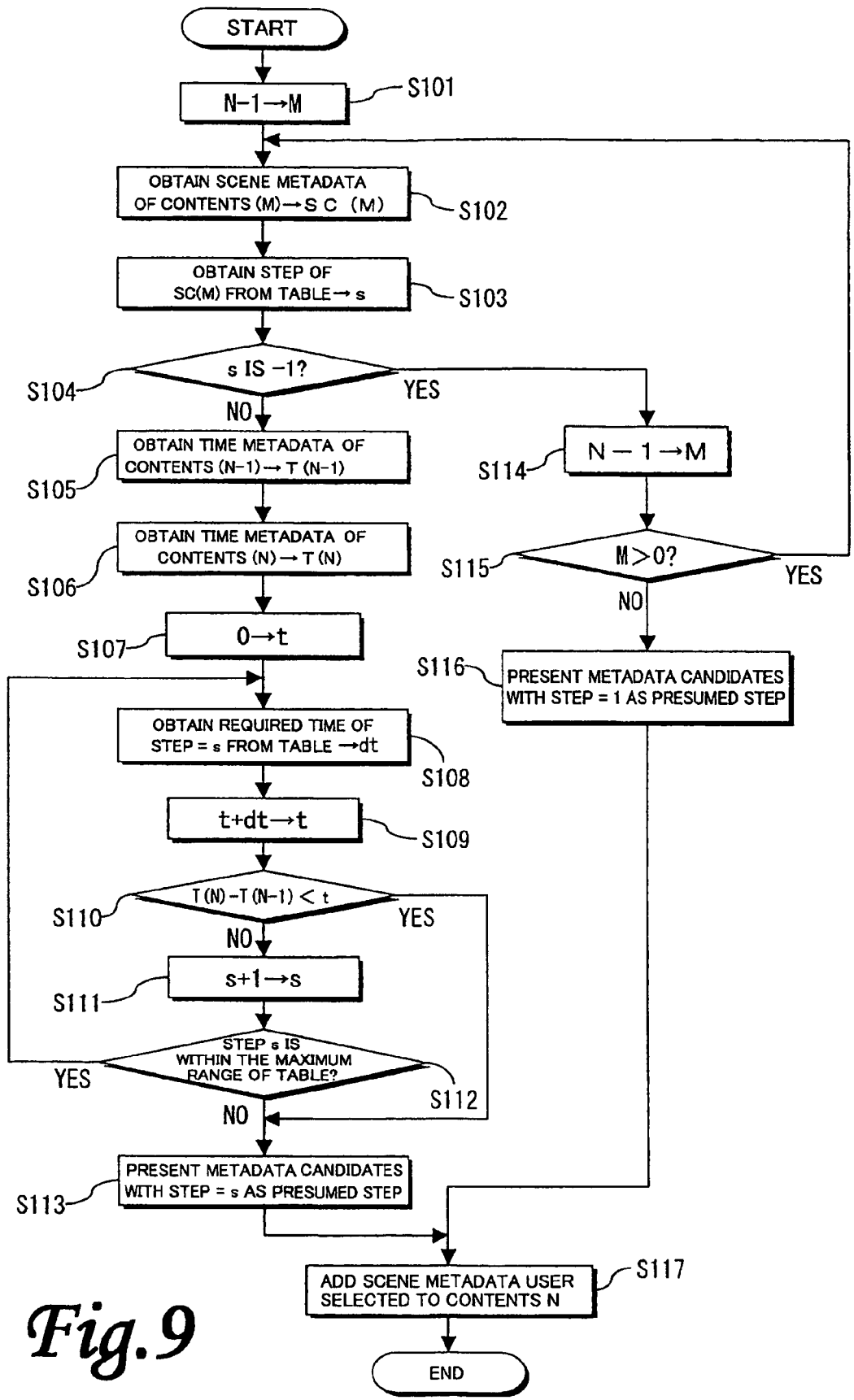
FIG. 9 is a flowchart showing control in performing the operation of adding metadata according to the first embodiment of the present invention.

Next description is made about the control procedure in the control processing portion 111 for adding metadata according to the first embodiment of the present invention. FIG. 9 shows a flowchart of control performed by the control processing portion 111 when the list of metadata candidates 720 of scenes is displayed and "shooting scene" metadata is added. Here in the flowchart shown in FIG. 9, certain image data N is selected as an object to which metadata is to be added, and the procedure starts when the above-described decision button of the remote controller is controlled. Also in FIG. 9, the image data is referred to as contents.

In other words, as seen from FIG. 9, in the processing step S101, an internal variable M which indicates image data (last image data) just before image data to be referred to is initialized and the last image data is set. Specifically, in the case shown in FIG. 7, the image data "#4" is set. Then, it goes to the processing step S102.

In the processing step S102, a value of the "shooting scene" metadata of the last contents (e.g. "bridal couple entry" of "#4") is read out to be stored in a value of the "shooting scene" metadata SC(M).

Then in the processing step S103, a shooting scene metadata set table (see FIG. 5, mentioned as "table" in FIG. 9) is referred to, a "step" value corresponding to the "shooting scene" metadata value SC(M) is read out and stored in "s".

When it goes to the processing step S104, a value in the "s" is checked and it is determined whether or not the value is "−1" which indicates that the occurrence order cannot be specified.

In the processing step S104, when the "s" value is "−1", it goes to the processing steps S114 and S115 sequentially, and when the last contents are set at previous ones within the scope of contents it proceeds to the processing step S102. Then, until the last contents are contents of which the occurrence order of a shooting scene can be specified, contents are searched in the reverse order of contents.

Then, even when the first contents are reached back and contents of which a step value is other than "−1" cannot be found, it goes to the processing step S116, the list of metadata candidates is displayed on a screen with "shooting scene" metadata of the step N=1 defined as a leading candidate, which is presented recognizable to the user, and it proceeds to the processing step S117 described later.

On the other hand, in the processing step S104, when the "s" value is not "−1", it goes to the processing step S105, in which the "shooting date and time" metadata of the last contents is read out and stored in T(N).

After that, it proceeds to the processing step S106, and a value of the "shooting date and time" metadata of the target contents is read out and stored in the T(N). This is followed by the processing step S107, in which the internal variable "t" for summing elapsed time is initialized.

After the internal variable "t" is initialized in the processing step S107, it proceeds to the processing steps S108 and S109 sequentially, and the shooting scene metadata set table is referred to. Then, a required time dt for the step s is read out and summed to "t".

Then, it goes to the processing step S110, in which a difference of "shooting date and time" between the last content and the target contents is compared with "t". Depending on the magnitude relation between the difference (T(N)−T(N−1)) and t, it is determined whether it is within the summed required time.

In the processing step S110, if the difference of the "shooting date and time" metadata between the last contents and the target contents is not within the summed required time (the processing step S110: NO) in other words, if the time difference of the shooting time between the two contents is larger than the summed required time, it is presumed that a shooting scene of the target contents is in a later step. Then, it goes to the processing step S111, the step "s" is incremented and it goes back to the processing step S108, in which summation of required time is carried out. Then, the processing of the processing steps S108 through S110 is sequentially performed again.

On the other hand, at the processing step S110, if the time difference of the two shooting times is within the summed required time "t" (the processing step S110: YES), it is presumed that the shooting scene of the target contents is in the step "s".

When it goes to the processing step S113, the "shooting scene" metadata of the step "s" is determined as a leading candidate and the list of metadata candidates 720 is displayed.

Then, as seen in the displayed screen of the aforementioned metadata, when one piece of the metadata is selected from the list of metadata candidates 720 by user operation, the selected metadata value is added as a value of the "shooting scene" metadata of the target contents in the processing step S117.

The list of metadata candidates displayed in the above-described processing is seen in the list of metadata candidates 720 on FIG. 7, in which a "snap" that may happen is always placed at the forefront. Next, steps of shooting scene metadata set table (see FIG. 5) are arranged in the order with the leading candidate at the forefront to display "shooting scene" metadata.

When there are some constraints of the screen layout, a triangle mark 722 is displayed indicating that there is other image data that cannot be displayed at the same time, as shown in FIG. 7, so that it is possible to scroll the screen by control of the up/down button of the remote controller.

Further, the step of the shooting scene metadata set table is in accordance with the occurrence order of the shooting scenes in the situation of "bridal party". Due to this accordance, by referring to a shooting scene indicated by the "shooting scene" metadata added to the last image data, the same metadata or metadata of the following step is most probably added to the target image data.

Furthermore, when the shooting time of the target image data is far from the shooting time of the last image data, it can be presumed that the bridal party goes on between the two shooting times. Then, by comparing the elapsed time with the required time of the shooting scene metadata set table, a value of the corresponding "shooting scene" metadata can be estimated.

On the other hand, when the elapsed time from the shooting time of the last image data is shorter than the required time shown in the shooting scene metadata set table, it can be presumed that the bridal party does not go on. Accordingly, it is presumed that the same metadata as that of the last image data can be added appropriately.

In fact, in the course of the bridal party, the planed time is shifted much or less. Therefore, there may occur a difference between the actual time and the required time determined in the shooting scene metadata set table. However, since the metadata candidates to be added are set near from the estimated result in the procedure of FIG. 9, it becomes possible to select appropriate metadata by much easier operation, as compared with the operation of always selecting metadata simply from the metadata list, thereby largely improving convenience level.

In addition, in the list of metadata candidates 720 shown in FIG. 7, such an operation system may be utilized that, when a user controls the up button to select a further upper candidate, a metadata candidate of a smaller step, instead of the estimated leading candidate, can be selected, thereby improving operational performance even if the actual time becomes different from the planed time.

Then, shot data to which the "shooting scene" metadata is added is stored in a storing part of a data storing portion 108 or an external memory card, for example.

Figure 10:
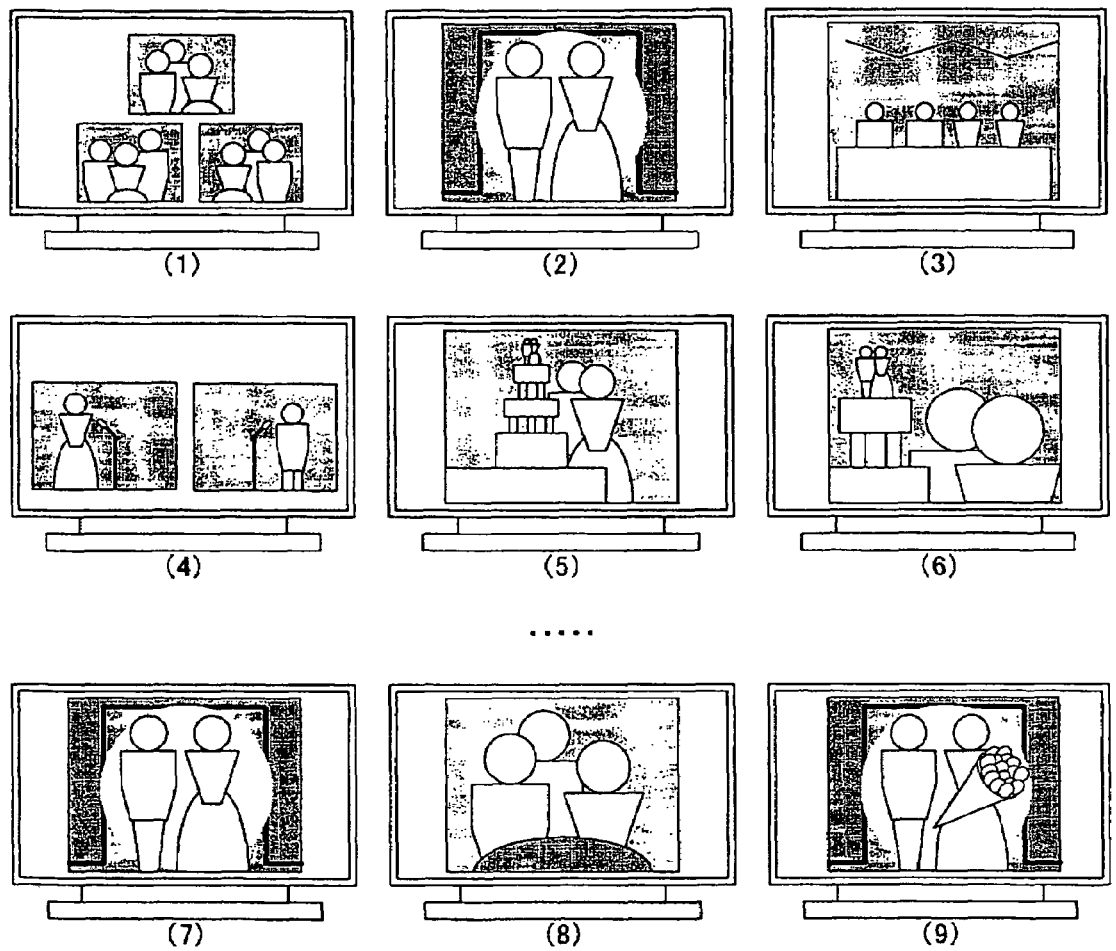
FIG. 10 is a schematic view showing displayed image data to which metadata is added according to the first embodiment of the present invention.

With the above-described procedure, shot data to which the "shooting scene" metadata is added is displayed on the digital television 100, which is shown in FIG. 10. What is shown in FIG. 10 is a state such that a user can view the shot data, and an "album display" is carried out as one example of the display layout on the display panel 113 of the digital television 100.

In other words, FIG. 10 shows that shot image data shown in FIG. 6 is sequentially displayed on the display panel 113 of the digital television 100. The shot image data is given metadata corresponding to its shooting situation based on the above-mentioned procedure of adding "shooting scene" metadata.

More specifically, with an example of "bridal party" taken, for example, FIG. 10(1) shows image data to which "snap" is added as "shooting scene" metadata. A snapshot is a picture of a small visual scene taken on the shooting date. Several pieces of the image data including snapshots before and after the snapshot can be displayed on one screen.

Further, FIG. 10(2) shows image data to which "bridal couple entry" is added. This image data, as well as the image data of "seating on stage" shown in FIG. 10(3), is displayed largely on the screen as highlight scenes in the "bridal party".

Furthermore, FIG. 10(4) shows two pieces of image data both given "main guest speech". The image data of such a situation is of a quasi-highlight shooting scene, and various shot images of guests on the stage are displayed in such a layout that peoples are not bored to view them.

A display layout of thus added "shooting scene" metadata values is performed based on an album layout data set stored in the data storing portion 108 of the digital television 100. This album layout data set is illustrated in FIG. 11.

As is shown in FIG. 11, in the album layout data set, a display size as an example of display layout, a display effect, a switching effect, and BGM as an example of audio and/or speech information are stored per value of "shooting scene" metadata.

Then, The control processing portion 111 of the digital television 100 reads out image data displayed from the data storing portion 108 during "album display", and when this readout image data is displayed, the album layout data set is referred to based on the added "shooting scene" metadata value, and a display layout, for example, a predetermined display size is determined.

Specifically, when "large" is selected in the display size, one piece of corresponding image data is displayed on a large size in the center of the screen, for example. When "middle" display size is selected, almost two pieces of image data are adjusted in scaling so that they can be simultaneously displayed on the screen. At this time, if the display size of the next image data is "middle" or "small", a layout is given such that the pieces of image data can be tiled to be displayed.

When the display size of the next image data is "large", the image data of "large" display size is to be displayed solely. Accordingly, image data of "middle" display size is also solely laid out and displayed in the center of the screen.

Further, when a display effect is designated in the album layout data set, for example, a soft focus may be applied in "cutting into wedding cake" or striation may be applied to a high-intensity part in "candle service".

Furthermore, when a switching effect is designated in the album layout data set, for example, in "guest reception" or "bridal couple entry", a fade-in effect may be used such that the image data is displayed in white at the display start time and then, color is gradually added to the image data to be displayed. On the other hand, in the case of "bride exit for makeover", a fade-out effect may be used to change a display of the image data into white gradually. In the case of "snap", the time period until the image data is switched to the next is automatically set shorter.

Furthermore, when a BGM is designated in the album layout data set, a BGM which is designated only for corresponding image data being displayed is replayed instead of a BGM which is designated for the whole album display.

Such layout effect and display effect as mentioned above can be automatically exerted by "shooting scene" metadata added to the image data. In addition, even if a large amount of image data is shot, since "shooting scene" metadata is selected from presumed metadata candidates following the above-described procedure and added to image data, it is possible to add an appropriate display effect to the shooting scene. Thus, it becomes possible to automatically view more-expressive and dynamic image data.

From the above explanation, according to the metadata storing method of the first embodiment, it is possible, in the operation of adding shooting scene information as metadata to contents of certain shot data, to estimate and present remarkable shooting scene metadata that is more likely to be added, from shooting scene information (shooting scene metadata) added to the last shot data and a shooting time thereof and a shooting time of the target shot data by using a set of shooting scene information contextually specified in a certain shooting theme (shooting scene metadata set), and besides, it is possible for a user to select necessary metadata form presumed metadata that is more likely to be added, thereby facilitating selection of target metadata and reducing working load largely. Hence, even for a large amount of shot data recorded in a large-capacity recording medium, it is possible to easily perform the operation of adding shooting scene information to the large amount of shot data.

In addition, since shot data (contents) is clear from the "shooting scene" metadata, a user does not have to perform complicated settings, however, it is possible to appropriately select a display effect in the contents display device when viewing the contents, thereby making it possible to enjoy a more-expressive, sharp or dynamic slide show.

Second Embodiment

Next description is made about a second embodiment of the present invention. This second embodiment is described with an example of the case where the present invention applies to a digital camera for shooting image data and storing it in a recording medium as an image file. A digital camera according to the second embodiment is shown in FIG. 12.

Figure 12:
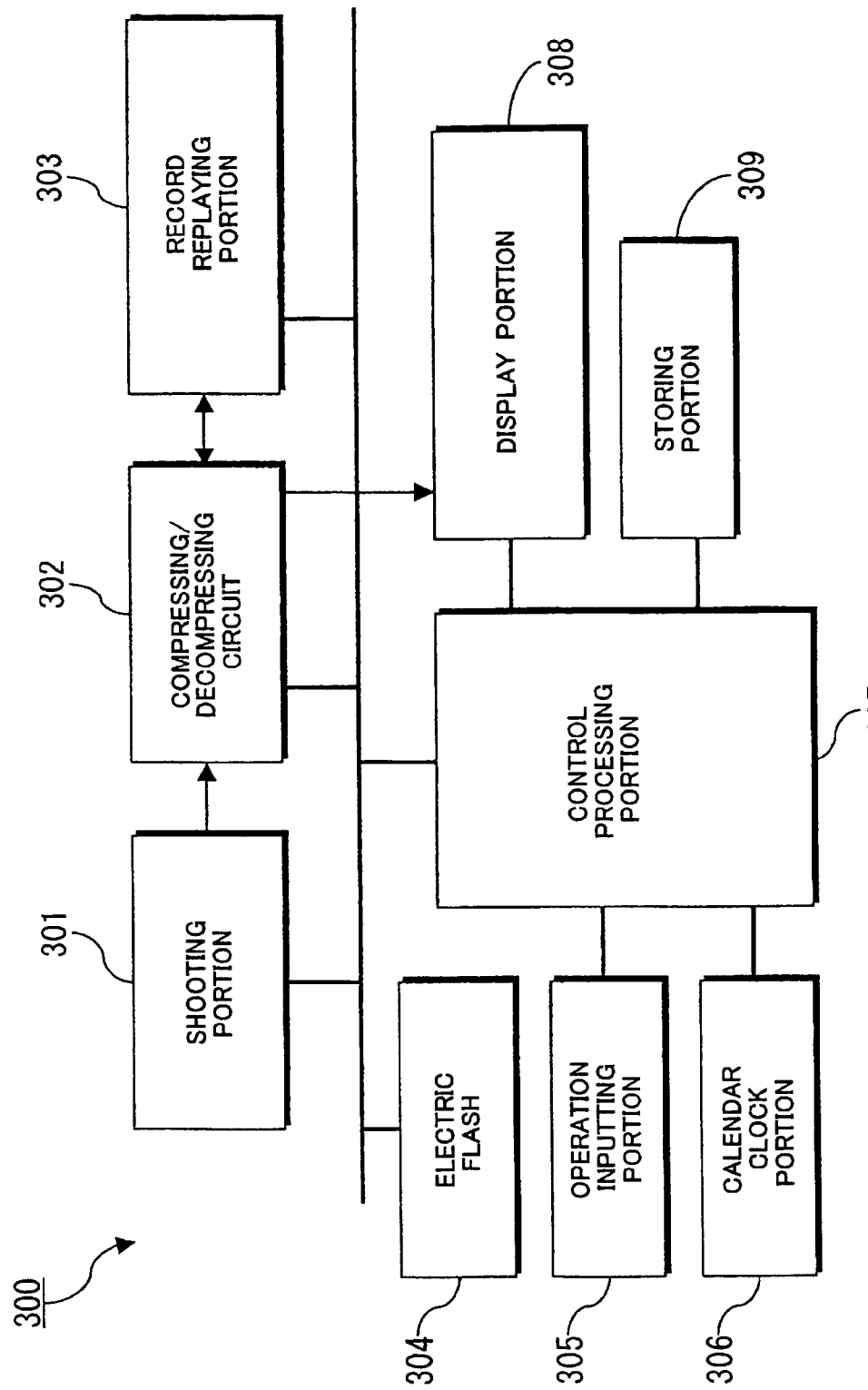
FIG. 12 is a block diagram illustrating a configuration of a digital camera according to a second embodiment of the present invention.

As shown in FIG. 12, a digital camera 300 according to the second embodiment is configured to have a shooting portion 301, a compressing/decompressing circuit 302, a record replaying portion 303, an electric flash 304, an operation inputting portion 305, a calendar clock portion 306, a control processing portion 307, a displaying portion 308 and a storing portion 309.

The shooting portion 301 has an optical system such as a lens and an aperture, an imaging element, an element driving circuit and the like, and is configured to shoot image electronically and output uncompressed image data.

The compressing/decompressing circuit 302 is configured to compress uncompressed image data, decompress compressed image data which is read out from a recording medium provided at the record replaying portion 303 and to output an image data signal so as to display it on the displaying portion 308.

The record replaying portion 303 is configured to add necessary additional data to compressed image data to compose an image file, store it in a recording medium such as a memory card, read out the image file from the recording medium and to read out compressed image data and required information which are to be displayed on the displaying portion 308.

The electric flash 304 is a light generating device for supplying necessary supplemental light when the exposure is insufficient in shooting. The calendar clock portion 306 is a processor for calculating shooting date and time. The operation inputting portion 305 is configured to receive input of, for example, a shutter button which is a trigger in shooting, when a user operates the digital camera 300.

Then, the control processing portion 307 is an information processing unit which is configured to be able to execute necessary controls over the above-mentioned components and has a storing portion such as a CPU, a RAM or a ROM for providing a user with functions of a digital camera.

This control processing portion 307 is configured to control graphic elements to be displayed on the displaying portion 308 so that a user can set the digital camera 300 appropriate for desired shooting, and to control operation conditions of respective parts of the digital camera 300 based on user's operation inputted via the operation inputting portion 305.

Further, the control processing portion 307 is configured to make what is input to the shooting portion 301 directed to a shooting object always displayed on the displaying portion 308 through the compressing/decompressing circuit 302 when the digital camera 300 is set in the shooting mode. In other words, the displaying portion 308 functions as a finder.

Furthermore, the control processing portion 307 is configured to control light generation of the electric flash 304 based on the setting when the shutter button of the operation inputting portion 305 is pushed at the instant at which it is determined shooting conditions desired by a user are met, and at the same time, to control the compressing/decompressing circuit 302 to compress image data shot by the shooting portion 301. In addition, the control processing portion 307 obtains actual date and time data from the calendar clock portion 306, which data becomes additional information together with information on the shooting conditions and information of the digital camera 300 and then, composes an image file with the image data. The control processing portion 307 controls to store the image file in a recording medium via the record replaying portion 303.

Then, a program code for the control processing portion 307 executing these controls is stored in the storing portion 309 together with other control data.

Besides, an image file structure, a metadata structure stored in the image file and added principal metadata are the same as those in the first embodiment (refer to FIGS. 2, 3 and 4) and description thereof is omitted here. The shooting scene metadata set table according to the first embodiment is (see FIG. 5) is stored in advance in the storing portion 309.

Figure 13:
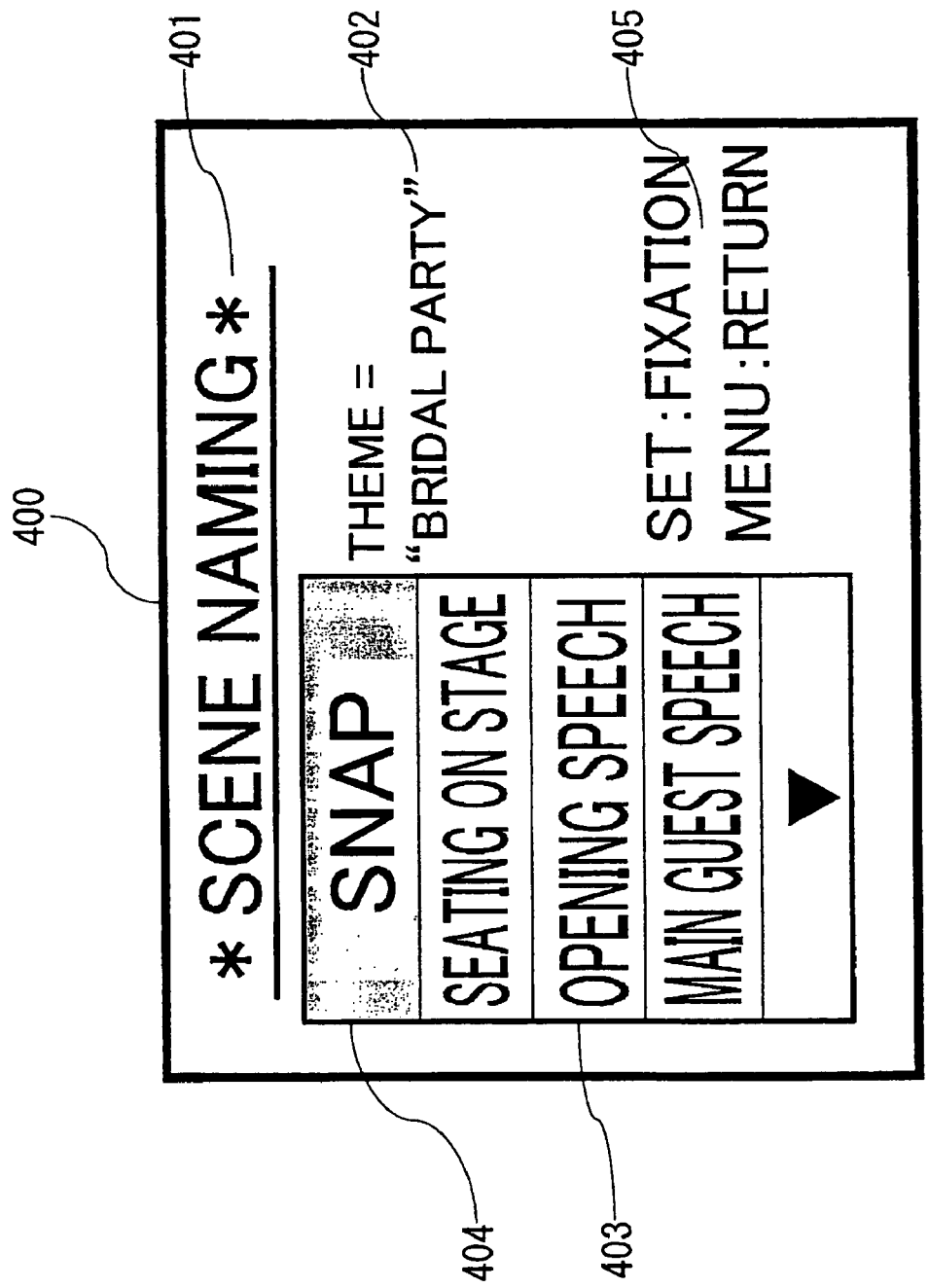
FIG. 13 is a schematic view illustrating a screen display in performing the operation of adding metadata in the digital camera according to the second embodiment of the present invention.

An operation screen is show in FIG. 13, which is displayed on the displaying portion 308 when a user inputs a value of "shooting scene" metadata out of the metadata added in shooting.

Shown on a display screen 400 of the displaying portion 308 is "shooting theme" metadata which is selected via another selection operation screen, so that a name of the shooting scene which becomes a value of the "shooting scene" metadata can be inputted. As shown in FIG. 13, in this second embodiment, a "bridal party" for example is selected as one example of the shooting theme 402.

Then, it is supposed that a user uses the digital camera 300 to shoot a bridal couple entering the party room on 11:15 and seating on the stage provided in the center of the room just after 11:18, for example. Shown in the display screen is a list of scene candidates 403 of "shooting scene" metadata to be added.

In the list of scene candidates 403, scene candidates which are more likely to be selected are arranged and, when the up/down button of the operation inputting portion 305 is controlled, a remarkable point display 404 is moved up and down in the list and when a SET button of the operation inputting portion 305 is controlled, one scene of the "shooting scene" metadata is selected to be added to the image data. Here in FIG. 13, the remarkable point display 404 is moved down by one to select "seating on stage".

Figure 14:
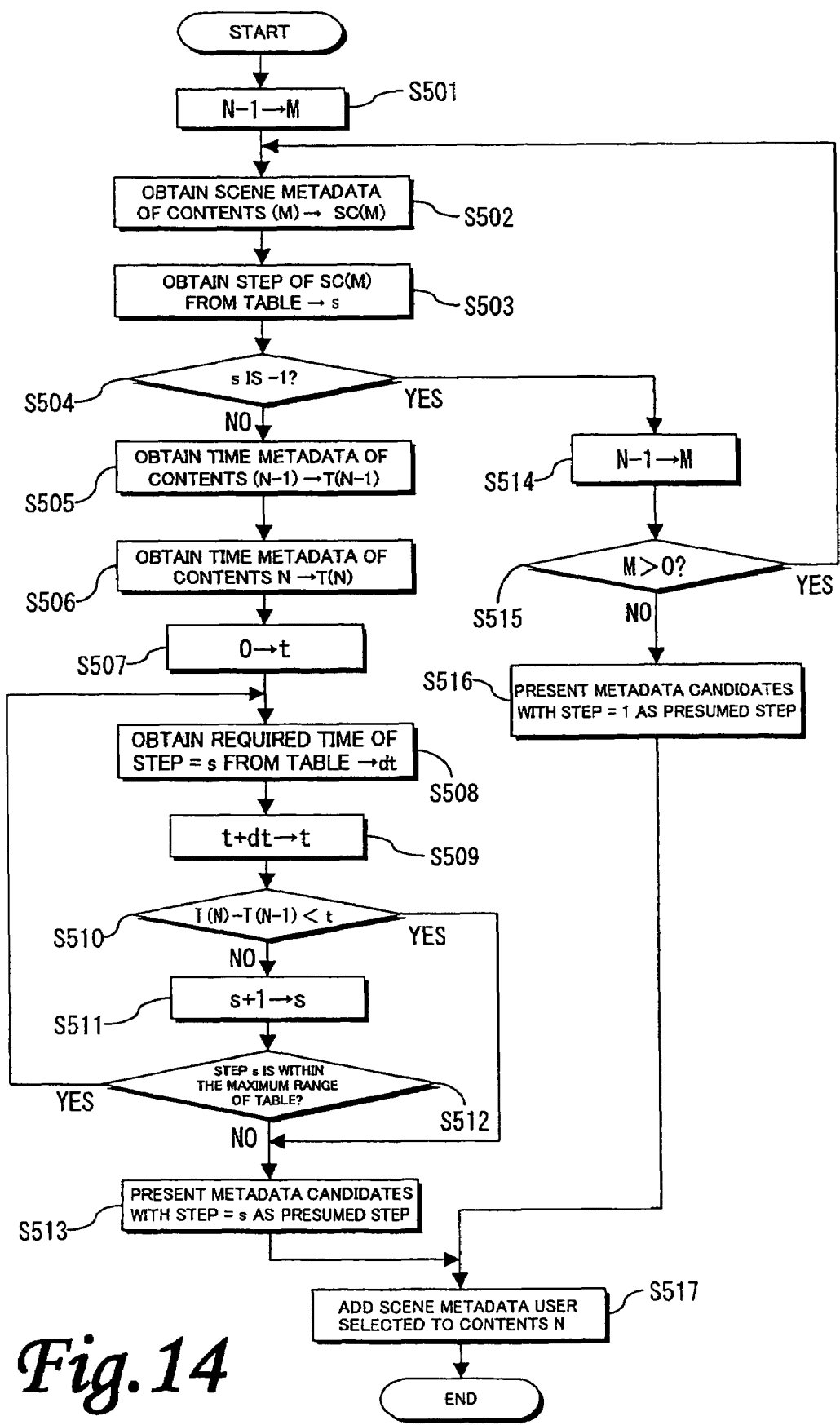
FIG. 14 is a flowchart showing a method for controlling the metadata adding operation according to the second embodiment of the present invention.

FIG. 14 is a flowchart for explaining the control performed when a list of scene candidates 403 is displayed and "shooting scene" metadata is added. In a sequence of operations for shooting image data N, it is when the operation of "naming a scene" is started that the flowchart in FIG. 14 is started. Here in FIG. 14, image data is called "contents".

Specifically, at first, in the processing step S501, an internal variable M which indicates the last shot image data just before the data to be referred to is initialized and the last image data before the target image data is set.

Then, it proceeding to the processing step S502, a value of the "shooting scene" metadata of the last contents is read out to be stored in SC(M).

Next, in the processing step S503, a shooting scene metadata set table is referred to, and a value of step corresponding to the "shooting scene" metadata value SC(M) is read out to be stored in "s". This is followed by checking of a value of "s" in the processing step S504.

In the processing step S504, it is determined whether or not the value of "s" is "−1" which means that the occurrence order cannot be specified.

In the processing step S504, when the "s" value is "−1", the processing of the processing steps S514, S515 and S502 through S504 are performed sequentially. More specifically, after the last contents are set at the previous ones within the scope of the contents, it goes to the processing step S502, in which the contents are searched in the reverse order of the contents until the last contents are contents of which the occurrence order of a shooting scene can be specified (s≠−1).

Then, even when the first contents are reached back and contents of which a step value is other than "−1" cannot be find, it goes to the processing step S516, in which the list of metadata candidates is displayed on a screen with "shooting scene" metadata of the step N (N=1) defined as a leading candidate, which is presented recognizable to the user. This is followed by the processing step S517 as described later.

On the other hand, in the processing step S504, when the step value is not "−1", it goes to the step S505, in which "shooting date and time" metadata of the last content is read out to be stored in T(N).

After that, it proceeds to the processing step S506, and the present time when shooting is carried out is measured to be stored in T(N). Then, in the processing step S507, the internal variable "t" for summing elapsed time is initialized.

Then, processing of the processing steps S508 and S509 are sequentially performed, the shooting scene metadata set table is referred to and a required time dt of the step in this table is read out to be summed to "t".

Proceeding to the next processing step S510, a difference between "shooting date and time" metadata of the last contents and the present time is compared with "t", and it is determined whether this is within the summed required time or not.

When a determined result of the processing step S510 shows that the difference between the "shooting date and time" metadata and the present time is larger than the summed required time "t" (S510: NO), a shooting scene to be shot in this stage is considered to be in a later step in the table. At this time, in the processing step S511, the step "s" is advanced by one, the processing goes back to the processing step S508 to perform summation of required time.

On the other hand, in the processing step S510, the time difference between the two shooting times, which is the difference between the "shooting date and time" metadata of the last contents and the actual time, is equal to or less than the added required time t, it is presumed that the shooting scene to be snapshot at this time is in the step "s". Then, it proceeds to the step S513, in which "shooting scene" metadata of the step "s" is set as a leading candidate to display a list of metadata candidates.

Then, as shown in FIG. 13, when one piece of the metadata is selected from the list of metadata candidates by user operation, it goes to the step S517, and this selected metadata value is added to a value of "shooting scene" metadata.

Besides, in displaying of the list of metadata candidates, likewise in the list 403 of metadata in FIG. 13, "shooting scene" metadata is displayed such as arranged in the step order of the shooting scene metadata set table with snaps which are more likely to occur placed ahead and a leading candidate then placed ahead.

However, there are some candidates that can be displayed simultaneously due to the constrains of the screen layout, which is shown by a triangle mark so that a user can realize that it is possible to scroll the screen by control of a button of the operation inputting portion 305.

Figure 15:
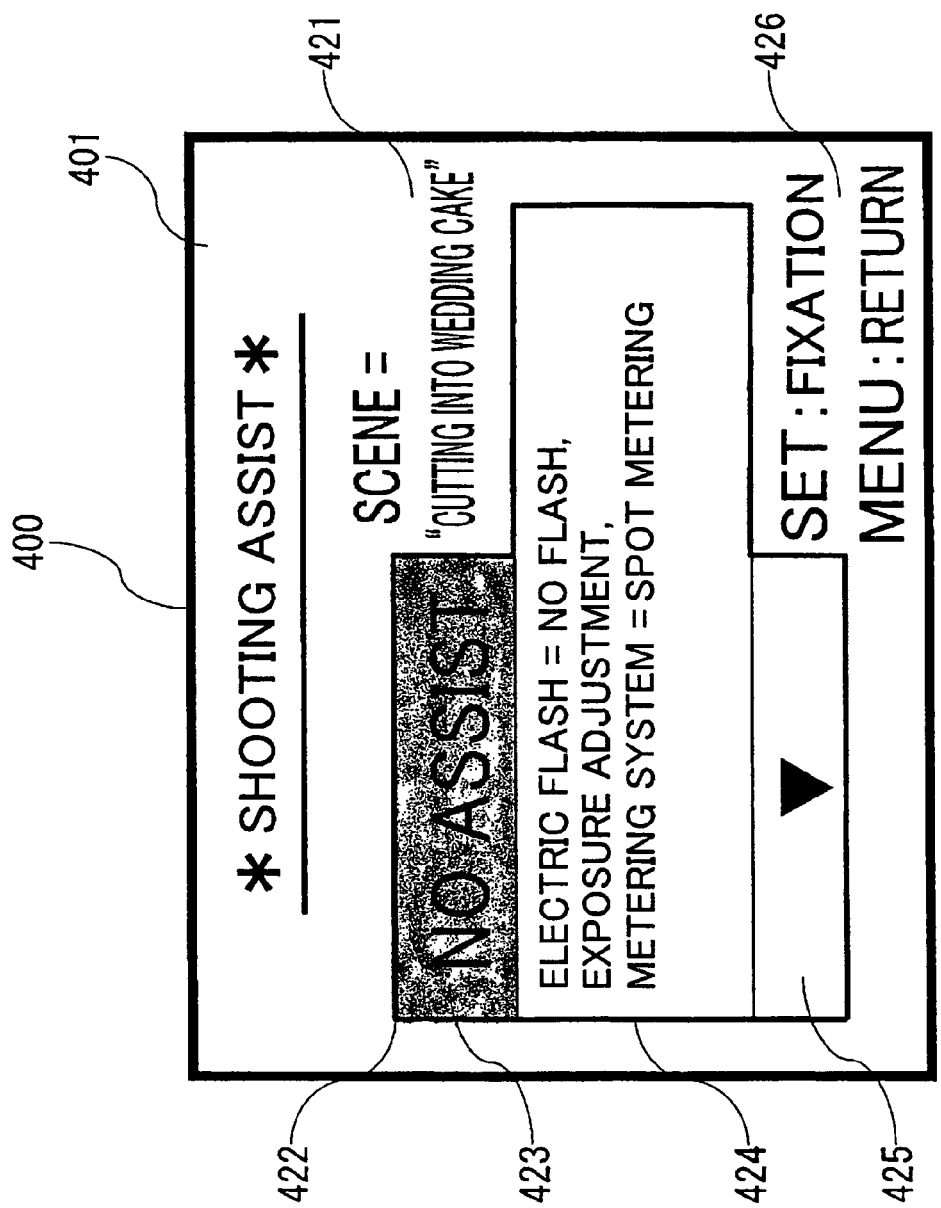
FIG. 15 is a schematic view showing a screen display for performing the shooting assist selecting operation according to the second embodiment of the present invention.

Then, regarding a shooting condition assist displayed when "shooting scene" metadata is thus added, an operation screen displayed on the displaying portion 308 is shown in FIG. 15.

More specifically, when "shooting scene" metadata is added in advance of shooting, a situation in which a user will shoot a snap can be specified. Therefore, the control processing portion 307 of the digital camera 300 refers to a shooting condition assist table stored in the storing portion 309 and, when there exists assist data, as shown in FIG. 15, this shooting condition assist is displayed on the displaying portion 308 so that a user can recognize it.

Also, FIG. 15 shows displayed screen 400 in which "shooting theme" metadata and "shooting scene" metadata are added by the above-described user operation and a value of the "shooting scene" metadata, that is, a scene section 421 is displayed.

In this second embodiment, as shown in FIG. 15, the scene of "cutting into wedding cake" is added. Besides, shooting conditions which are effective in snap-shooting of this scene are displayed on the screen 400 as "shooting assist" 424.

When there is an option 423 of not adopting these shooting conditions or anther optional setting, the operation of displaying shooting conditions of this setting is displayed (e.g. by a triangle mark 425).

While such option 423 or triangle mark 425 are displayed, if a user controls an operation button of the operation inputting portion 305 of the digital camera 300, a display 422 indicative of options is moved up and down so as to select any shooting condition, and the option selection is fixed by control of the SET button of the operation inputting portion 305.

Regarding such a shooting condition assist, contents thereof are conceptually shown in an example of the operation condition assist table in FIG. 16.

As shown in FIG. 16, in the operation condition assist table, shooting conditions which produce more effects if they are set at the time of snap-shooting (Section of "Assist" in FIG. 16) are stored for each value of "shooting scene" metadata.

Then, as the control processing portion 307 of the digital camera 300 refers to the operation condition assist table stored in the storing portion 309, options of the shooting conditions as described above are displayed in such a manner that a user can recognize it.

When predetermined options are selected from these options of shooting conditions, the control processing portion 307 performs setting of the predetermined shooting conditions on components of the digital camera 300, such as the shooting portion 301 and electric flash 304 if necessary.

The shooting conditions to be set in the operation condition assist table are high-level shooting conditions that go beyond the scope of general auto shooting condition setting programs which function in the control processing means of a digital camera, and their effect is highly expected depending on situations.

Specifically, for example, when the shooting scene is an event of cutting into a wedding cake in a bridal party, it is preferably supposed that snap-shooting is performed of a close-up of a bridal couple standing in the strong spotlight in a dark, light-dimmed party room.

Although snap-shooting is possible almost without fail in the case of snap-shooting in accordance with the general auto shooting condition setting programs, due to averaging of the balanced exposure condition by multi-spot metering and the illumination condition by an electric flash light, ever part within the range of snap-shooting is shot, which results in average snap-shooting.

Then, in order to shoot a snap of a shining bridal couple standing in the spot light, it is preferable that the exposure condition of snap-shooting is adjusted to a part of the spot light. Light generation by the electric flash is canceled (inhibited) so that a surrounding area of the bridal couple is made dark like in a shadow and the exposure condition is further adjusted in the plus direction to strengthen a shining image.

It is necessary for setting of such shooting conditions to obtain information of this shooting scene, and this setting is extremely difficult to be realized only by adopting simple auto shooting condition setting programs. In other words, such setting is possible only when a shooting scene is specified as "shooting scene" metadata at the time of snap-shooting.

Further, setting of detailed shooting conditions is more complex than setting of the auto shooting condition setting programs, and requires knowledge and experience of shooting conditions depending on the situation. Therefore, a user who can set these shooting conditions manually is limited to a user having extremely much knowledge and experience.

On the other hand, a shooting scene is a name of a situation associated with a social event or state, and every user can grasp and understand it. In addition, in snap-shooting with use of a camera, even a user who does not have extremely much knowledge and experience can recognize the shooting scene with ease. Therefore, it is very easy for the user to select a desired shooting scene from shooting scene candidates displayed in a list of "shooting scene2 metadata.

In this way, it is possible to assist the operation of setting high-level shooting conditions associated with "shooting scene" metadata. According to the metadata adding method of the second embodiment and a system such as an imaging apparatus which adopts this metadata adding method, snap-shooting by a more sophisticated digital camera is possible with simple operation, and a significantly preferable effect can be achieved in the light of utilization of a digital camera by a user.

Up to this point, we have specifically described embodiments of the present invention. However, the present invention is not limited to the above-described embodiments and various modifications may be made based on the technical idea of the present invention.

For example, the numerous values cited in the above-described embodiments are taken solely as examples, and different numerous values may be used if necessary.

For example, in the description of the first embodiment, the shooting metadata set table is stored in advance in the data storing portion 108 of the digital television 100. However, it may be read out from a memory card together with image data files shot by the record replaying portion 109 of the recording medium and stored in the data storing portion 108.

In addition, a metadata set table readout from a memory card may be a whole data set or a partial data set of one or plural "shooting themes".

Further, a metadata set table may be downloaded as appropriate by a network connecting circuit (not shown) provided in the digital television 100. Such data addition or change may apply to an album layout data set table.

Furthermore, such data addition or change may be realized by a configuration in which already stored shooting metadata set table and album layout data set table are permanently changed or a configuration in which they are temporarily changed. Or, it may be realized by a configuration of combination of standard data having permanent values and temporal data tinged with particular conditions.

Furthermore, according to the above description, album display layout and the like are uniquely determined by the "shooting scene" metadata. This setting is preferably performed in an automatic way while eliminating the need for a user to perform particularly complex operation, and it is possible to configure a system such that a user can perform an operation of changing the setting freely or appropriately based on his/her idea and intention. In addition, for example, the setting may be changed by user operation with use of an edit display such as a display for adding "shooting scene" metadata shown in FIG. 7.

Furthermore, according to the first embodiment, a step and a required time defined for each "shooting scene" metadata are fixed. However, the present invention is not necessarily limited to fixing of required time.

Furthermore, when metadata is added after shooting, as described in the first embodiment, it is possible to define steps and required times in accordance with elapsed time based on actual proceeding record of a bridal party where pictures are taken.

Then, by comparing shooting time metadata added to shot data to thus defined metadata set, it becomes possible to determine a shooting scene with high probability. In this case, if a system is configured such that "shooting scene" metadata candidates are shown to a user, metadata adding is automatically performed and data correction is performed where necessary, it is quite efficient in the processing of adding metadata to a large amount of image data.

Further, in such a system, if proceeding time data of the party is distributed, this may improve convenience for guests, and it is possible as a service in the party room to create proceeding time data of an actually held event and hand it over to an organizer or to distribute it to the guests.

Further, for example, in the above-mentioned second embodiment, the shooting scene metadata set table is stored in the storing portion 309 of the digital camera 300 as a part of a program of the control processing means. However, it may be stored in a recording medium to be referred to from the control processing means via memory card input and output means. Besides, the table may be configured to be stored in the storing portion 309 or a recording medium via other communicating means provided in the digital camera 300.

Furthermore, in the above-described second embodiment, a shooting scene metadata set table read out from the recording medium or storing portion may be a whole data set or a partial data set of a single or plural "shooting themes". Such data addition and modification also apply to an operation condition assist table.

The present invention is applicable to a metadata storing method and a metadata adding apparatus, and a contents displaying apparatus and a contents imaging apparatus. Particularly, the present invention is advantageous to be used in a digital television or a digital camera which adds metadata to image data or video data.

This application claim priority from Japanese Patent Application No. 2003-295586, which is hereby incorporated by reference, herein.

What is claimed is:

1. A metadata adding method for adding scene metadata to image data as information related to a scene thereof, the scene metadata being indicative of a scene included in an event, the method comprising the steps of:

retrieving from a storing portion a table listing scene-metadata candidates to be added to image data, the scene-metadata candidates representing scenes of the event, wherein the scene-metadata candidates are listed in the table in a particular order, and each of the scene-metadata candidates is associated with a required duration of a corresponding scene of the event;

designating image data to which scene-metadata of the event is to be added by user operation;

searching for image data, which has shooting time information representing a shooting time earlier than the shooting time of the designated image data, and to which scene metadata of the event has already been added;

acquiring shooting time information of the designated image data, shooting time information of the searched image data, and the scene metadata added to the searched image data;

determining a scene-metadata candidate to be added to the designated image data, by presuming the number of scenes of the event that occur between the scene of the event corresponding to the searched image data and the scene of the event corresponding to designated image data, based on the difference between the shooting time of the designated image data and the shooting time of the searched image data, and on the retrieved table listing scene-metadata candidates of the event; and displaying the determined scene-metadata candidate to be added to the designated image data.

2. A metadata adding method according to claim 1, wherein in the determining step, if the difference between the shooting time of the designated image data and the shooting time of the searched image data is smaller than a predetermined time, the determining step determines the scene metadata added to the searched image data as the scene-metadata candidate to be added to the designated image data, and if the difference between the shooting time of the designated image data and the shooting time of the searched image data is longer than the predetermined time, the determining step determines that a scene metadata candidate which is listed in the table after the scene metadata candidate corresponding to the scene metadata added to the searched image data is the scene-metadata candidate to be added to the designated image data.

3. A metadata adding method according to claim 1, wherein the scene metadata to be added to the designated image data includes information indicating the situation of a shooting scene and at least one of information indicating the display size of image data, information indicating a display effect for image data, and information indicating audio to be replayed with image data.

4. A metadata adding apparatus that adds scene metadata to image data as information related to a scene thereof, the scene metadata being indicative of a scene included in an event, the apparatus comprising:

a storing portion that stores a table listing scene-metadata candidates to be added to image data, the scene-metadata candidates representing scenes of the event, wherein the scene-metadata candidates are listed in the table in a particular order, and each of the scene-metadata candidates is associated with a required duration of a corresponding scene of the event;

a designating portion that designates image data to which scene-metadata of the event is to be added, based on a user operation;

a searching portion that searches for image data, which has shooting time information representing a shooting time earlier than the shooting time of the designated image data, and to which scene metadata of the event has already been added;

an acquiring portion that acquires shooting time information of the designated image data, shooting time information of the searched image data, and the scene metadata added to the searched image data;

a determining portion that determines a scene-metadata candidate to be added to the designated image data, by presuming the number of scenes of the event that occur between the scene of the event corresponding to the searched image data and the scene of the event corresponding to designated image data, based on the difference between the shooting time of the designated image data and the shooting time of the searched image data, and on the retrieved table listing scene-metadata candidates of the event; and a displaying unit that displays the determined scene-metadata candidate to be added to the designated image data.

5. A metadata adding apparatus according to claim 4, wherein if the difference between the shooting time of the designated image data and the shooting time of the searched image data is smaller than a predetermined time, the determining portion determines the scene metadata added to the searched image data as the scene-metadata candidate to be added to the designated image data, and if the difference between the shooting time of the designated image data and the shooting time of the image data of the earlier-occurring scene is longer than the predetermined time, the determining portion determines that a scene metadata candidate which is listed in the table after the scene metadata candidate corresponding to the scene metadata added to the searched image data is the scene-metadata candidate to be added to the designated image data.

6. A metadata adding apparatus according to claim 4, wherein the scene metadata to be added to the designated image data includes information indicating the situation of a shooting scene and further includes at least one of information indicating a display size of image data, information indicating a display effect for image data, and information indicating audio to be replayed with image data.

* * * * *